April 24, 1934.   E. BEHRINGER   1,955,787
PASTEURIZING APPARATUS
Filed May 6, 1932   5 Sheets-Sheet 1
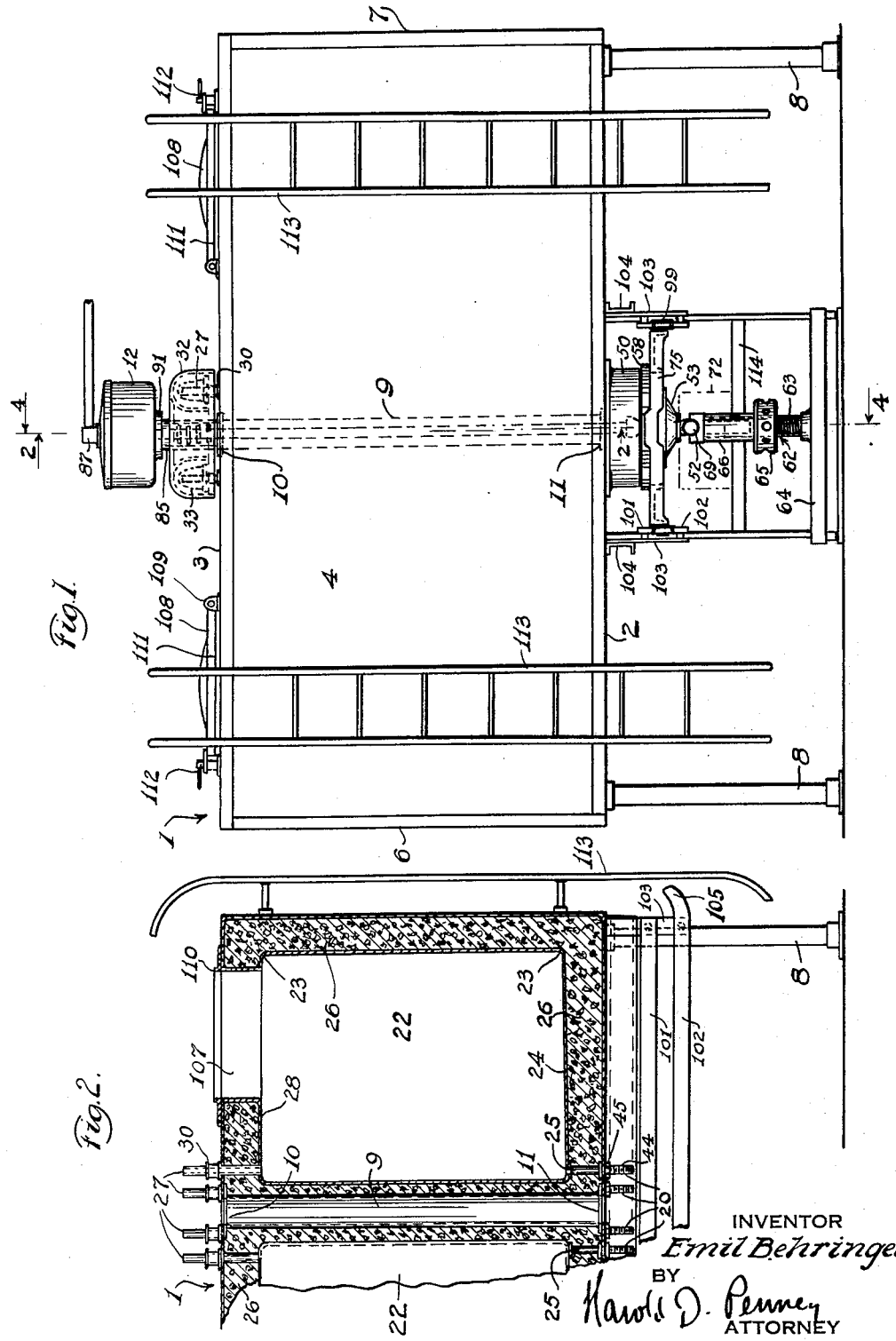
INVENTOR
Emil Behringer
BY
Harold D. Penney
ATTORNEY

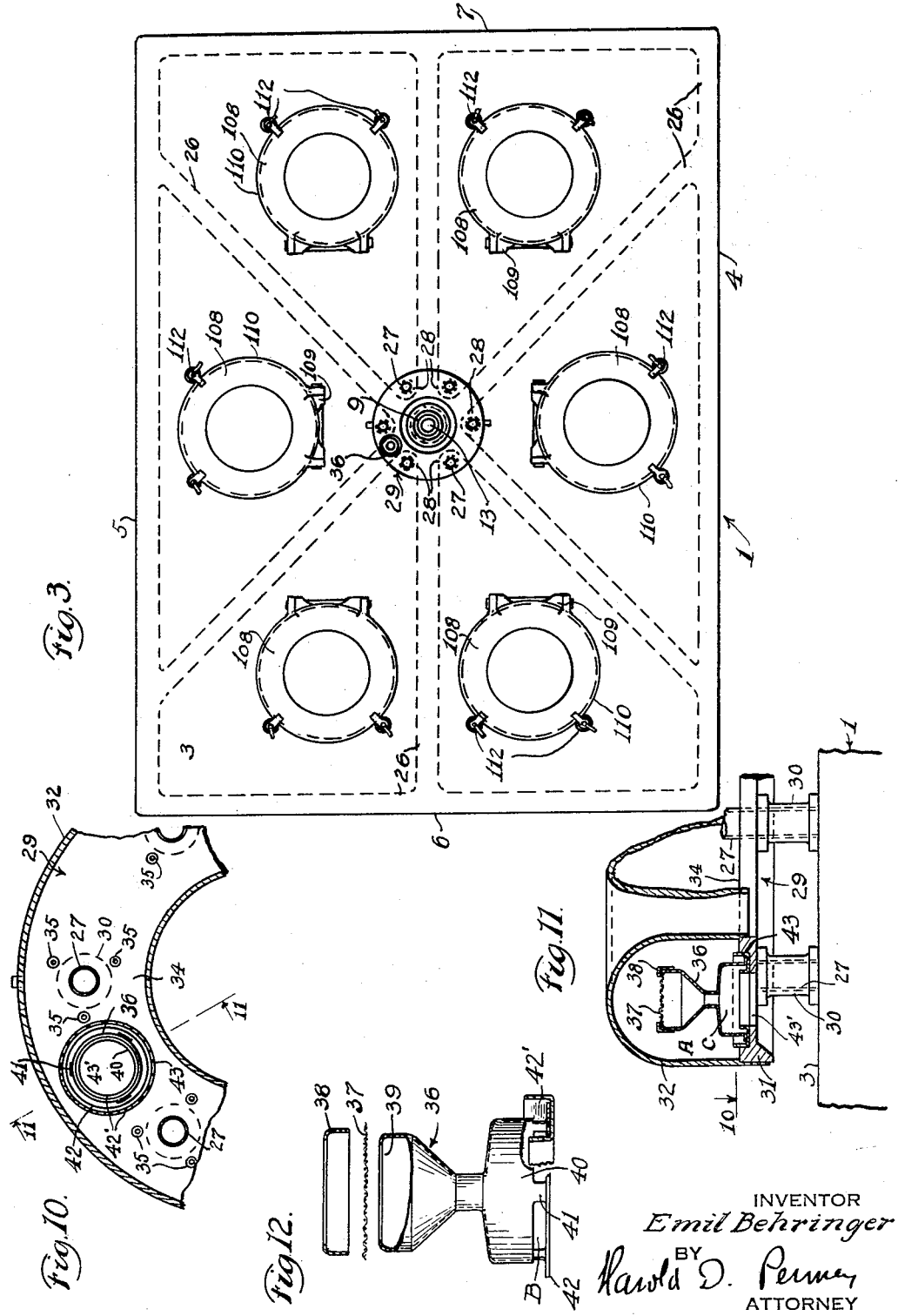

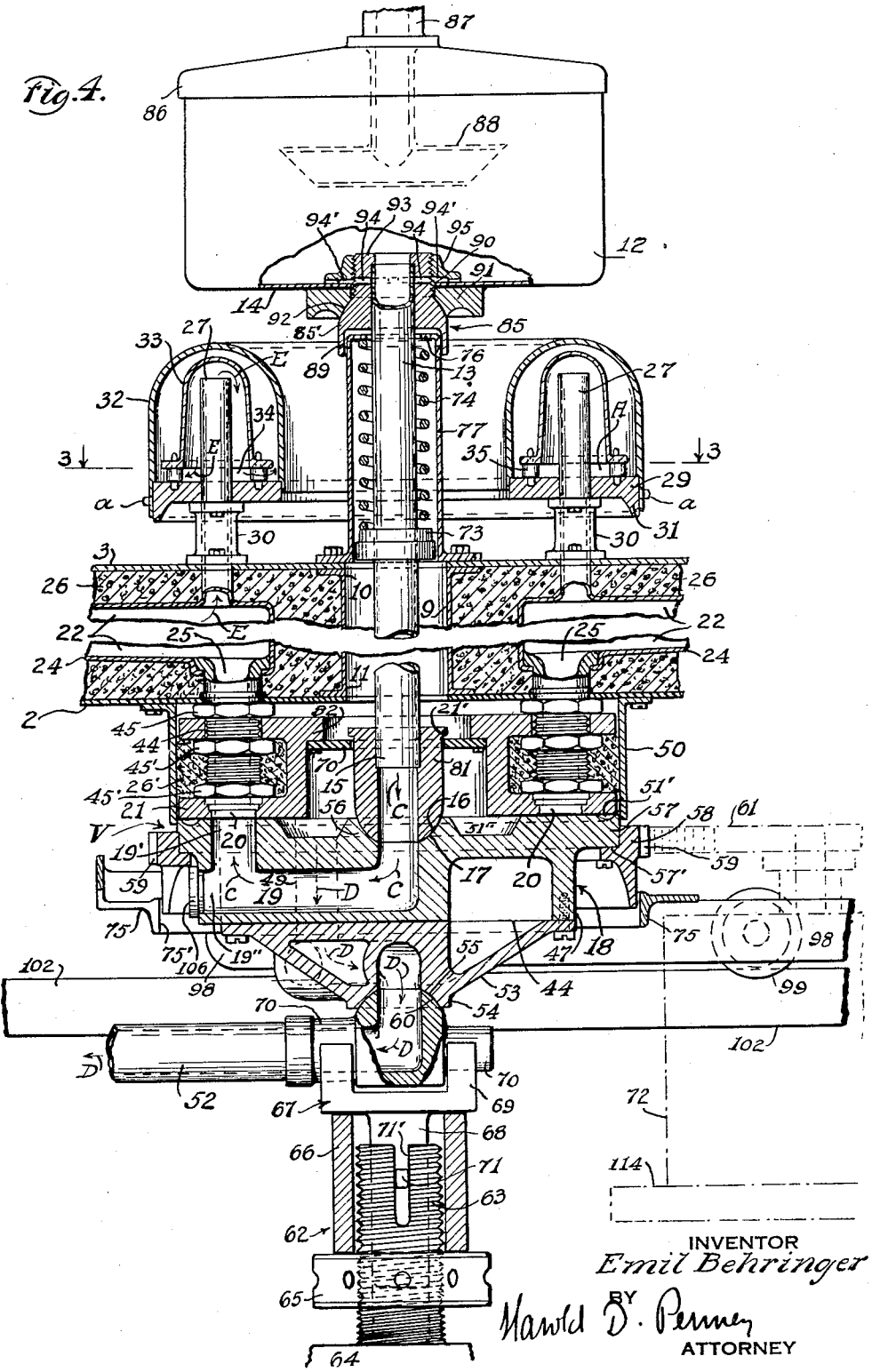

April 24, 1934.     E. BEHRINGER     1,955,787
PASTEURIZING APPARATUS
Filed May 6, 1932     5 Sheets-Sheet 4
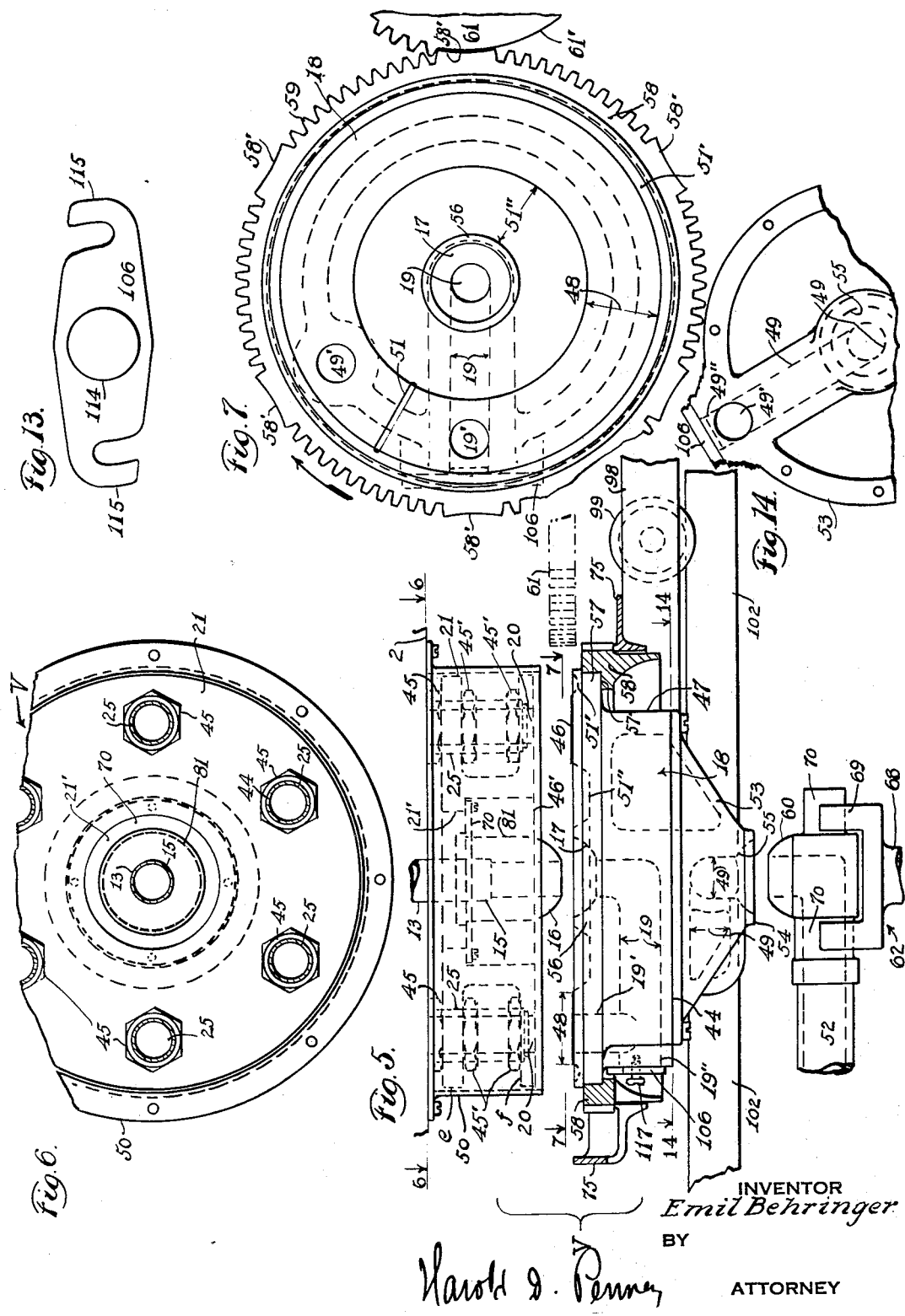
INVENTOR
*Emil Behringer*
BY
Harold D. Penney
ATTORNEY April 24, 1934. E. BEHRINGER 1,955,787
PASTEURIZING APPARATUS
Filed May 6, 1932 5 Sheets-Sheet 5
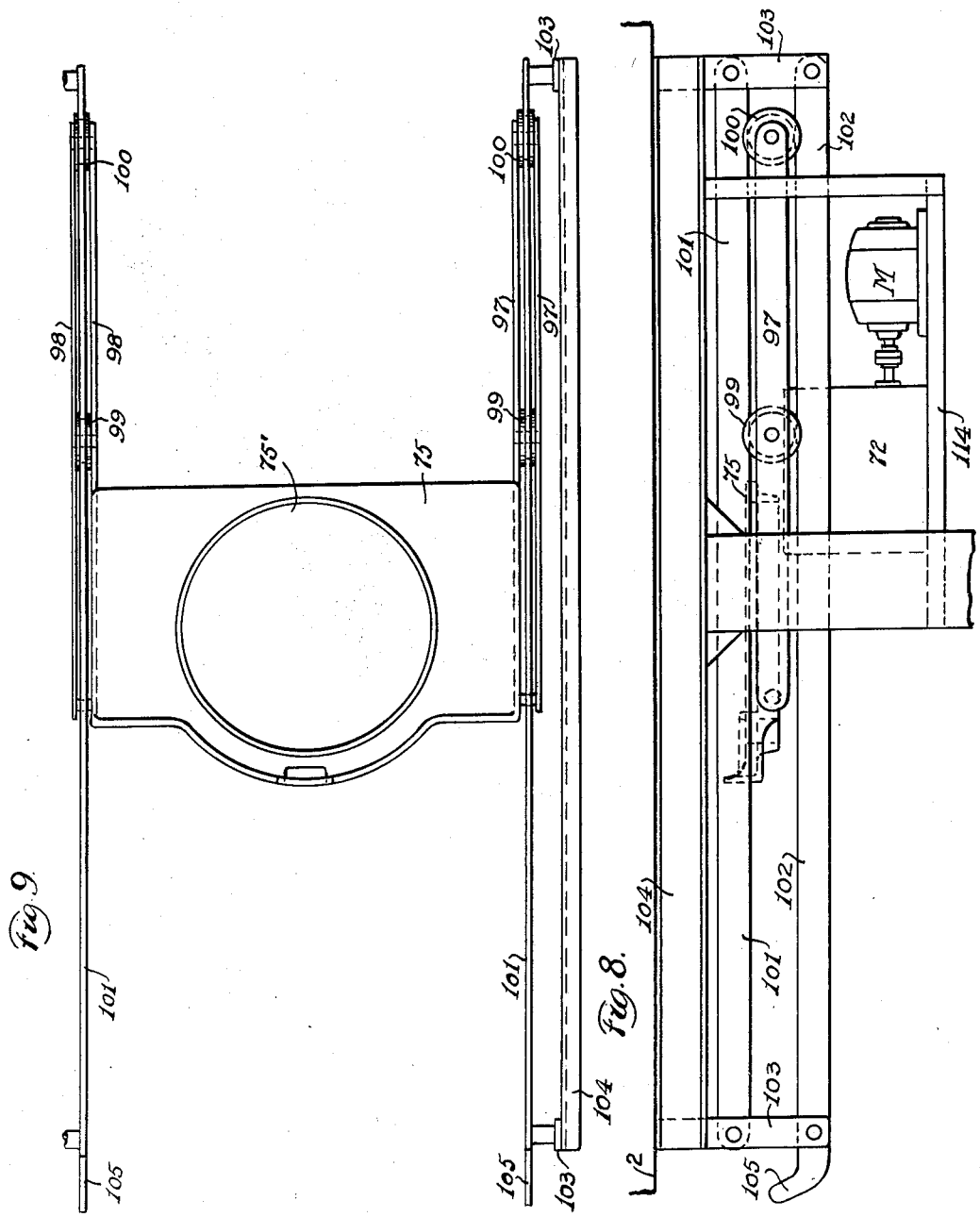

Patented Apr. 24, 1934

1,955,787

UNITED STATES PATENT OFFICE 1,955,787

PASTEURIZING APPARATUS

Emil Behringer, Richmond Hill, N. Y.

Application May 6, 1932, Serial No. 609,752

27 Claims. (Cl. 137—21)

My present invention relates to an improvement in apparatus for pasteurizing milk and other liquids and is specially directed to an improvement in milk holders, in which, in well known practice liquids such as milk, at pasteurizing temperatures, are passed into and are held in separate compartments in such holders at the pasteurizing temperatures for predetermined time periods, thereby to destroy bacteria.

The present device is normally made of a large size thereby to handle large quantities of milk, at capacities of from about 10,000 to 26,000 lbs. of milk per hour, thus by its larger capacity, being extremely economical in operation.

Owing to the large capacities of liquid thus treated, more precise means have been developed in the present structure to prevent ingoing and outgoing milk from being, even remotely, possible to become intermixed.

Owing to the greater milk flow into said device at greater velocities, an anti-foam receiver is provided, and to further prevent foaming in filling all milk enters from the bottom into each holder.

In order to reduce the number of parts which have to be cleaned after each holding operation, a single unitary self-facing valve is provided at the bottom of the holder, whereby all filling and emptying of milk to and from the holder is controlled thereby. Thus only the unitary valve and its appurtenant ducts, as will hereinafter be described in detail, including the interior of the holders themselves require cleaning after each run of milk, in addition to the feeding means.

A further advantage of the present construction is that the holders are without interiorly located pipes of any kind, thus the interior of the compartments therein are unobstructed, are smooth with rounded corners and thereby are easily cleaned after each use. Manholes are provided at the top of each compartment for entry therein, and manhole covers are removably mounted to cover said manholes in a liquid tight sanitary seal.

A further advantage is the provision of a sanitary, sealed air filter and exchanger including a filtered air relief means and a safety milk relief device, whereby as will be later outlined, air may be expelled during filling of the compartments, or may be drawn into said compartments during emptying thereof, such indrawn air being filtered, in passing to the interior of said compartments.

Power driven means are provided for timed control of the emptying and filling sequences to the several compartments of the holder.

Owing to the size of the flow control valve structure and its weight, means are provided for rapidly releasing and sliding said valve to and from its operative seat for cleaning and inspection and manipulable means are provided to rigidly lock it into, or unlock it from its operative flow controlling position in a leak proof manner.

These and many other capabilities will be apprehended as the herein description proceeds, and it is obvious that modifications may be made in the herein outlined principles and structure without departing from the spirit thereof, or the scope of the appended claims.

In the accompanying drawings;

Fig. 1 is a front elevation;

Fig. 2 is a sectional elevation taken on the line 2—2 of Fig. 1 looking in the direction of the arrows;

Fig. 3 is a top view of the holder, expansion chamber and air exchanger dome being removed;

Fig. 4 is an enlarged, fragmented sectional view of the holder taken on the line 4—4 of Fig. 1, looking in the direction of the arrows;

Fig. 5 is a view of the valve and valve seat details, similar in position to that of Fig. 4, the valve being shown separated ready to be slid out;

Fig. 6 is a plan view of the valve seat body locking in the direction of arrows 6—6 of Fig. 5, this body being removed from the bottom of the holder 4, to which it is normally, rigidly affixed.

Fig. 7 is a plan view of the milk flow control valve looking in the direction of the arrows 7—7 of Fig. 5;

Fig. 8 is a side view of the flow control valve slide carriage mechanism;

Fig. 9 is a plan view of Fig. 8;

Fig. 10 is an enlarged fragmentary plan view of the annular ring and the air exchanger valve, taken on line 10 of Fig. 11, looking in the direction of the arrow;

Fig. 11 is a sectional view taken on the line 11—11 of Fig. 10, looking in the direction of the arrow;

Fig. 12 is an enlarged side view of the air valve, in separated assembly;

Fig. 13 is an enlarged side view of one of the valve milk duct enclosure caps; and Fig. 14 is a plan view of the base portion of the flow control valve looking in direction of arrows 14—14 Fig. 5.

In Fig. 1 the milk holder housing generally denoted by 1, is shown as being substantially of rectangular formation and is adapted to receive treated milk within a series of six sealed compartments, to hold the milk a predetermined length of time, and, thereafter to automatically discharge the same. The said holder housing comprises a base portion 2, a top 3, front and rear side walls 4 and 5 and end walls 6 and 7 substantially and rigidly joined together forming a rectangular outer casing and mounted upon four adjustable leveling legs 8. These adjustable legs are for the purpose of setting the complete apparatus dead level regardless of floor conditions, and thus eliminate stresses in the casing.

The central portion of the milk holder 1 is provided with a vertical metal jacket or tube 9, which is flanged at both ends as at 10—11, Fig. 2, and attached, rigidly in position to the walls forming base 2 and top 3 of the said casing.

The milk holder 1 is provided with a series of six radially separated compartments or tanks 22, which are shown in Figs. 2 and 3, formed seamless, with tops, bottoms and sides having rounded corners 23 and shaped substantially triangular in cross section. The lower portion or bottom 24 of the said tanks, as in Fig. 2, are sloped toward the center of the holder which causes the milk, when the tank is being emptied, to drain toward inlet-discharge ducts 25, which are connected integrally and with a seamless joint with the said tank bottom 24.

As in Figs. 2 and 3, the milk compartments 22 are separated or spaced from one another and the space filled by an insulation filling 26, preferably of granular cork, which prevents the loss of heat of the pasteurized milk while being held in the compartment.

As a compartment 22 is being filled with milk the displaced air of the said compartment must be released, therefore top vent or breather pipes 27 have been provided, one for each compartment, and as in Figs. 2 and 3, these vent pipes are shown circularly spaced and integral and seamless with the interior walls of the upper narrow portion 28 of the said compartments and thereafter extend upwardly through the cork insulation 26 and the top casing 3 for a distance above the top of said casing and thence upwardly through an annular support ring 29.

The said vent pipes 27 are provided with surrounding, flanged spacing spools 30, Figs. 2 and 11 which serve to hold the said annular support ring 29 a predetermined distance above the top casing 3. The support ring 29 is provided with a downwardly depending flange 31 which is adapted to support a seated and screwed on ring chamber cap 32 which completely encases the upper open ends of the circularly arranged vent pipes 27.

In Figs. 3, 4, 10, 11 and 12, the annular support ring 29 and ring chamber cap 32 are clearly shown, and it will be noted that separate, small enclosing safety milk anti-splash domes 33 are provided which act as covers for each of the air vent pipes 27, the said domes being flanged, and supported on and above the inner face 34 of the annular ring 29, by shouldered studs 35, which removably support said antisplash shields or domes, leaving an air space A, between the flanged bottom of the said domes and the said face 34 of the support ring 29.

The ring chamber cap 32, best shown in operative position relative to the air breather tubes 27 in Fig. 4, and in fragmentary sectioned plan in Fig. 10, is of annular form, domed and in cross section as in Fig. 4 has two down standing sides thus being of invert U section. When this ring chamber cap is affixed to the opposite sides of ring support 29 by means of screws $a$, it is substantially air and liquid tight, though easily removed and replaced.

In the position shown in Fig. 4, the ring chamber cap 32 completely encloses the air-exchanging tubes 27 and the air-filter 36, which will now be described.

The air filter 36 is clearly shown in Figs. 10 and 11, and in more detail in Fig. 12, as a formed hollow Venturi like tube of thin metal having a removable suitable air filter 37 securely held by a cap ring 38 over the upper open end 39, of the said exchanger. The lower open end 40 of the said exchanger is cut out in places to form a series of supporting legs 41 and an outwardly flaring, integral flange portion 42, with a series of open spaces B formed above the said flange. The said exchanger 36 is removably supported in a U-shaped trough like annular ring 42' which is adapted to be initially filled with liquid such as water to a sufficient height to cover the open spaces B above the said flange of the said exchanger, to act as a seal against air entering the ports B, but which will allow any overflow of milk from the tubes 27, during the filling operation of the compartments to gradually fill the chamber A Fig. 4, to about the level C and such overflow will be directed through the water seal and ports B, thence through port 43' to the top 3 of the holder casing 1, thereafter to be wiped up. Thus the initially liquid sealed air filter is also a liquid overflow seal for any milk that may, during operation of the holder, splash or flow up through the air tubes 27 and be deflected downwardly, by the domes 33 thereover, be overflowed to atmosphere without reentering any of the other holder compartments 22, thus preventing contamination of one compartment from another.

The trough like annular ring 42' is securely held seated in upper bore 43 of a counter bored air inlet 43' in the ring 29.

Fig. 4 is a condensed view, in section, showing most of the component parts of my device, with the holder portions broken away, for convenience in showing.

In this figure, there is shown the milk receiving and discharge ducts 25, which are suitably connected to the bottoms 24 of each compartment structure 22, in a liquid tight joint. Preferably these duct members are welded at their connection juncture with said bottoms 24, and extend below the bottom outer casing wall 2. Each extension of the duct members 25 is threaded along its exposed length as at 44, and lock nuts 45 may be screwed upon these threaded extensions to clamp the ducts firmly and their operative positions against bottom casing plate 2.

The milk holder is provided with a cylindrical, milk bubble break up or expansion tank 12 which is located and supported above and at the top of the central portion of the said milk holder by a centrally located, gravity feed pipe 13, which is attached to the lower portion 14 of the said expansion tank 12, and extends downwardly, through the jacket 9 in the center of the milk holder and extends through the bottom 2 thereof, as Fig. 4. The lower end 15 of the said pipe 13 is provided with a fixedly mounted and rounded terminal valve or end portion 16 which is so formed as to engage with and be seated in a leak proof manner, a coacting ball seat or recess 17 in the central portion of a rotatable milk valve 18, and the said valve, which will be more fully described hereinafter, is provided with a U shaped port 19 which opens upwardly into the said recess portion 17 and extends radially outward, and, thereafter upward to register with the bottom openings of ducts 20 which extend downwardly through stationary valve 21, and terminate at the lower face thereof.

In Figs. 4 and 5, the said milk flow valve seat and control valve, generally denoted as V, is shown and comprises two parts; a movable ported part as 18 and a stationary ported part as 21, each having a ground surface as 46 and 46′ adapted to bear against one another to form a perfect seal. The upper or stationary part 21 is formed like a spool, having upper and lower flanges e and f respectively, Fig. 5, and is connected to the ducts 25 which terminate in counterbored holes or openings as 20, in the lower flange f of the said stationary member.

The movable flow control valve 18, is provided with two ports 19′ and 49′, extending upwardly into the ground face or plane 48, these ports being shown in the plan view of the flow control valve 18, Fig. 7. One port or duct 19′, forms a milk inlet leading from the U shaped port 19, in the flow control valve 18, and the other port 49′ forms an outlet and extends downwardly towards and joins an L shaped port 49 in the lower portion of said valve, Figs. 4 and 14.

The ports 19′ and 49′ are radially spaced from each other so as to register, during the rest position of the valve 18, with an adjacent two of the six ducts 20—25, in stationary valve or seat 21. Flow control valve 18, is moved in timed, intermittent sequence so that each of its ports, in turn, register with two of the ports 20—25 in the fixed valve seat portion 21. The intermittent drive means will be later described.

As this milk holder is provided with six milk compartments, and as each compartment is provided with an outlet pipe, as 25, terminating in a port 20, each of these ports 20—25 serve also as a milk inlet pipe. The stationary valve or seat member 21, is therefore adapted to receive each of the extended threaded pipes 25, as previously stated, through counter-bored holes in the flanges of the said valve 21, thereby forming port bottom openings as 20, and the said stationary valve 21 is held in place by welding and lock nuts 45′ provided on the threaded portion 44 of said pipes 25.

After the said stationary valve is positioned and assembled, the ducts and nuts are insulated by a nonheat conducting material such as cork 26′, Fig. 4, and an outer surrounding and protecting band or ring 50 is provided and attached to the base of the casing 2.

The contacting ground surfaces 46 and 46′ of the stationary seat 21 and the movable valve 18 are self-facing during use, and form a perfect seal when in operative contact. Further, to prevent leakage of milk from the outlet 49′ to the inlet port 19′ of the movable valve 18 a scraper groove 51, Fig. 7, is cut radially across the ground surface 46, of the said valve 18 between the said inlet and outlet ports 19′ and 49′ respectively. During rotation of valve 18, this groove 51 scrapes the surfaces 46′—48 clean of any milk film and discharges the milk at either end thereof to waste.

The inlet port opening 19′ which is part of the U shaped inlet port 19, of the flow control valve 18, Fig. 4, registers with one of the port openings 20 in the stationary valve 21 while the outlet port opening 49′ of the said movable valve registers with an adjacent preceding port opening in the stationary valve, the movable valve 18 moving in the direction of the circumferential arrow, Fig. 7.

The opening 49′ forming the upper portion of the L shaped outlet port 49, Fig. 7, is shown in dotted lines in Figs. 4 and 14.

While the coacting seat and valve members are in operative position, heated milk flows down the center feed pipe 13, Fig. 4, as per arrows c from the chamber 12, thence down, through the U shaped port 19′—19 in the movable valve 18, thence upwardly through the stationary port 20 and through the duct 25 into the compartment 22, while, simultaneously, the L shaped port opening 49′ of the said flow control valve 18 registers with the forward tank or preceding port opening, thereby allowing the previously entered charge of milk which is in this forward tank to empty out by gravity through the L shaped outlet 49, the milk flowing in the direction of the arrows D out through a ball ended discharge pipe 52—60, Fig. 4.

Thus, as the flow control valve 18 is stopped at its port registering positions with the ports of seat portion 21, there is a simultaneous feed to one compartment 22 while another compartment is being discharged of its contained charge.

During the interim, the other four compartments 22 having been previously filled with heated milk are held full until they are reached in sequence by the flow control valve ports, to be thereby emptied and refilled. This procedure is well known in the art of pasteurizing milk.

The action of the air relief means, in detail is as follows; when the run of milk is first started into the holder compartments, they being all empty, the air displaced from the six compartments 22 is all passed out to atmosphere through the filter medium or cloth 37, said filter being sealed at its bottom by means of a liquid seal in 42′, as previously described.

After the compartments 22 are all filled, and the working sequence of emptying and filling is then commenced, there is no further discharge of displaced air from the compartments, such air is then merely transferred from the compartment being filled to the compartment being emptied, through the inter-communicating tubes 27, Fig. 4, and the closed ring like chamber formed by the annular cover 32. Inasmuch as the air or vapor in the compartments is sterile, this transfer of vapor or air from one compartment to the other maintains perfectly sterile conditions in the said compartments during sequential operation.

Should any surplus air be expelled or taken in through the automatic breather or air exchanger 36, Figs. 11 and 12, it is filtered through the filtering cloth 37.

Compartments 22 are all emptied and filled at the bottom of the holder, the same ducts 20—25 being used for both operations and the compartment being emptied is the one preceding that being simultaneously filled, the direction of travel of the flow control valve 18 being in the direction of the arrow Fig. 7. As there shown, the emptying port 49′ of valve 18 is in advance of the filling port 19′.

The flow control valve 18, Figs. 4, 5 and 7, has, at its lower face, 44, a conical disc like cover portion 53 which is removably secured thereto and is so constructed, as shown in Fig. 14, to form the lower portion of the L shaped outlet port 49. The lower central portion 54 of this conical disc 53 into which the said port 49 downwardly terminates is cupped as 55 to seat the angled ball end 60 of the milk outlet pipe 52.

The upper central portion 56 of the valve 18 is also cupped as 17 to seat the ball end 16 of the main inlet pipe 13. Both of these ball seated connections are, in operation, liquid tight and are in axial alinement.

The top disc like rim 57 of the said valve 18 is secured in a recessed seat 57' of a Geneva toothed ring gear 58, Figs. 5 and 7, which is provided with six sets of intermittent teeth as 59, adapted to be engaged and driven at intervals by a suitable interrupted tooth drive gear 61, these gears 59 and 61, forming the means for intermittently rotating the said valve 18, part of the said intermittent drive gear being shown in Fig. 7, at 61.

The mode of actuating gears 59 and 61 is conventionally shown in Fig. 8, the motive force being an electric motor M fixedly mounted on framing generally denoted by 114, which is supported by channel irons 104, these in turn being attached to the bottom 2 of the casing, Figs. 1, 2 and 8. A conventional reduction gearing, not shown, is supported in a grease packed housing 72 also fixedly mounted upon said frame 114 and is coupled to the motor.

The reduction gearing, in turn, drives the interrupted tooth gear 61, at a reduced speed, from the motor M, and gear 61, as shown in Fig. 7, intermittently drives the flow control valve connected timing gear 58 and valve 18 at the required sequential time periods for holding, emptying and filling the compartments 22.

The motor M, Fig. 8, which drives the gears which are encased in the grease or filled housing 72, is rigidly attached to a base 114 which is suspended from the underside of the casing 1.

The timed flow control valve 18, when in operative port controlling position, as in Figs. 1 and 4, is held upward against the stationary valve seat 21, by the upward pressure of a screw jack 62, which is adapted to be manually operated, to either force the separable valve structure and ball end joints into leak proof contact or to release same for dismantling for cleaning, after a run of milk.

The said jack is comprised of a screw threaded hollow post 63 secured to a supporting base 64, and a threaded hand wheel or nut 65, is utilized for raising or lowering a thrust sleeve member 66, which loosely fits the said hollow post and one end of which rests upon the upper face of the nut 65, and the other end of which is in operative connection with a yoke member, which has a stem portion 68, and is adapted to slide in the said hollow threaded post 63. Two yoke arms 69 formed on the upper portion of the stem, are adapted to be engaged on their under face by the top of said sleeve 66, the upstanding arms 69 being seated and formed to fit opposed trunnions 70 provided on the ball shaped outlet pipe 52, best shown in Fig. 4.

The stem 68, of the said yoke member has a lug key 71, Fig. 4, which slidably rides in a slot 71' provided in the hollow post 63, thereby preventing the yoke 67 from turning during the turning of the jack hand wheel 65 to close or open the valve assembly.

It is obvious from the foregoing detailed description that the flow control valve and the ball joints 16—17 and 55—60 are rigidly held in rotative assembly.

In removing the valve 18 for cleaning it is only necessary to loosen the hand wheel 65, by reversing, sufficiently to allow the movable valve 18 to clear its seat 46', and to rest upon a wheeled carriage 75, which will hereinafter be explained, the said valve is then drawn out on the cleaning carriage, which runs upon suitable rails, 102, to the front of the holder, making it easily accessible for cleaning the valve and its ports.

The ring gear 58 and its fixed movable valve 18 are shown held upward in their raised operable position by the said lifting jack 62, in Fig. 4, and as above set forth, the valve may be lowered, by turning, in the reverse direction, the nut 65 of the said jack which lowers the outlet pipe 52 the ring gear 58 and movable valve 18, to a position as shown in Fig. 5. The ring gear and valve, it will be noted, by referring to Figs. 8 and 9, are now supported by a slidable carriage 75 which is fully shown in said Figs. The said carriage is provided with an opening 75' adapted to receive and support the lowered valve and assembly.

The carriage 75 is provided with spaced roller carrier frames 97 and 98 attached fixedly thereto at opposite sides, Fig. 9, which are adapted to receive and rotatably support grooved tracking wheels 99 and 100 within the said spaces. The said tracking wheels are adapted to roll between upper and lower tracks 101 and 102 respectively, which are held and supported by bars 103 extending downward from channel beams 104 fixedly attached to underside of the casing 2.

With the valve and associate parts lowered into the carriage 75, they may be rolled out on the said tracks to beyond the front of the casing 1 where the said ring gear and valve may be removed and cleaned. Upturned ends 105 on the forward portion of the lower tracks 102 form stops and prevent the carriage from rolling off the tracks.

The double railed carriage mount herein shown and described has the added features, in addition to permitting ease of handling and cleaning of the valve and appurtenances, of also holding the valve clear of all parts except the carriage 75, as the wheels 99 and 100, are to the rear of the valve and the upper and lower rails 101, 102, above and below the rolls or wheels 99 and 100 counteract the tendency of the carrier means to tip downwardly at the front, when the valve assembly is in the carriage and the carriage extended beyond the front of the casing 1.

The carriage assembly, further, as herein constructed has only one spanning member, namely, the carriage 75 itself, so that the rails and wheel assembly when at the rear of the tracks, as shown in Fig. 8, normally span the valve locking means, the drive gear and motor without interference therewith.

When returning the cleaned valve assembly on the carriage to restore the valve to operative position, the carriage is returned to its central seating position, is reengaged with the rounded nose 60 in its rounded valve seat 55, by operating the lifting screw jack upwardly to reseat the valve, and this movement reengages the valve with its seat, and the ring gear 58 with its drive gear 61 at the proper positions, ready for operation.

In order to insure a leak proof engagement of all operative faces in the valve assembly and their seats, including the joints 16—17 and 55—60 a few extra turns may be given to wheel 65, thus causing all faces to be compressibly seated together in a leak tight manner.

In cleaning the valve and its ports, it will be noted that the ducts 19 and 49, as in Figs. 4, 5, 7 and 8, are open at the ends of their straight horizontal portions, and these open ends are closed by similar cap plates 106, shown in Fig. 13.

These flanged cap plates are provided with a central boss 114 extending from one face thereof, this boss fitting the bore of the respective ducts to close same, and the plates have two hook like end-flange extensions 115, to receive tightening screws 117, Fig. 5, therein. The removal of these plates permit the straight passage of the ducts 19 and 49 to be exposed from the exterior of the valve to facilitate cleaning thereof from the perimeter of the valve.

In milk handling equipment of the present type, aside from the strict requirements of bacteriological sterility, the factor of most importance is the provision, in such a structure, of a complete adaptability of quick take down of the appurtenant parts for cleaning, scouring and sterilizing after each run of milk. Conversely, ease of cleanly and rapid reassembly is another important factor.

From the foregoing description of the structure it is obvious that the movable valve means and its associate cooperating parts, ducts and faces are all quickly and easily portable for cleaning and reassembly.

As has also been described the compartments 22, the anti-foam tank 12, and the appurtenant connections therebetween are all so constructed as to be readily dismantled, thereby to insure exposure of all parts thereof, which have contact with the milk, thereby to expose these parts and their interiors for thorough cleansing and sterilizing.

For the purpose of permitting an operator to enter the milk compartments 22, to clean the same, said compartments are provided with suitable sized openings or manholes 107 as in Figs. 1 and 2. The manholes are provided with hinged covers 108 which are hinged to lugs 109 integral with manhole bushings or rings 110 which are attached to the upper portion of each milk compartments. The said rings 110 are provided with gaskets 111 and the covers 108 are clamped down by suitable clamps 112 to the said rings thereby forming fluid and air-tight closures.

Ladders 113 are provided and may be attached to the front wall 4, Fig. 1 of the casing 1, thereby to permit the operator to mount the housing for cleaning or adjusting parts located on top of the milk holder.

As previously outlined, the present holder is provided with a milk receiving anti-foam, or milk settling tank 12, for eliminating foam of the incoming milk. This tank receives all milk that enters the compartments 22, and as the milk is held therein for a short while, it is thereby settled and the foam dispersed.

The said milk holder 12 is provided with a removable fluid tight cover 86 attached to a suitable milk inlet pipe 87 which extends partway down, into the said holder, forming an open-ended, inverted T 88 which discharges milk from both ends into the tank. This breaks the fall of the milk and, in a measure prevents some foaming of the incoming milk.

The bottom 14 of the said tank is provided with an opening 90, and, externally mounted to said bottom 14 is a spherically recessed hub 91, which is adapted to rest upon a spherical shoulder 92 of a flanged coupling member 85. A threaded shank end 93, of the coupling member 85, which surrounds the upper end of the main inlet milk feed pipe 13 is provided with drain holes 94, which, when the expansion tank 12 and coupling 85 are assembled as shown in Fig. 4, are level with the bottom of the tank, allowing any milk that may be finally left in the lower part of the tank 12 to find its way into the inlet pipe 13 through the said drain holes.

An interiorly located lock nut 95 is provided to clamp the bottom of the expansion tank between the threaded shank 93 and the locknut. The locknut base is provided with a series of grooves 94' thereby allowing any remaining milk, after a run to drain through said grooves 94', to the drain holes 94 in the shank 93 and from thence into the main inlet feed tube 13.

The lower large diameter 85' of the coupling member 85 is bored as 89, to form a lower cylindrical flange thereon thereby to cover, with a loose fit, the top of a flanged spring housing 77 which forms an upper guide for the milk inlet pipe 13. The lower end of the housing is outwardly flanged at the bottom by which it is rigidly mounted to the top walls of the casing 1.

As in Fig. 4 the main milk inlet feed pipe 13 through which milk passes from the tank 12 to the valve 18, when in operative vertical position, compresses a spring 74, which surrounds the upper portion of the said inlet pipe, by means of an integral collar 73 mounted on the said pipe 13 and the flanged top 76 of the spring housing 77, which is attached to the top 3 of the casing 1, as previously described.

The main inlet milk feed pipe 13, has its upper end, Fig. 4, located in liquid tight fit in the upper ball-end coupling 85 of tank 12, to which it is open. The lower end of said pipe 13 is connected into the lower ball-end coupling 81 in a similar manner.

The inner, open flange 82, of the valve seat member 21 is provided with a rigid support ring 70, Fig. 4, which is bored to loosely fit and guide the ball-end fitting 81 on pipe 13. Thus spring 74, which normally urges the pipe 13 downwardly through pressure upon the collar 73 on pipe 13, causes the ball-end 16 of fitting 81 to bear firmly and resiliently upon the ball-seat 17 in valve 18. By this construction, the faces 46 and 46' of the valve and valve seat, respectively, are in control the amount of pressure to be exerted by the closing jack 62, and the ball-end seating of the pipe 13 is resiliently accommodated thereto.

In order to prevent the vertical feed pipe 13 from dropping out of operative position entirely, when the valve 18 has been removed for cleaning, the upper portion of fitting 81 is provided with a flange 21', which engages the top of the support plate 70, when valve 18 is out of operative position.

Thus the centrally mounted assembly of the tank 12, the main inlet milk feed pipe 13 and its appurtenant lower ball-end valve are resiliently mounted, to accomplish a firm liquid tight fit with the valve seat 17, when the valve 18 is firmly seated against the face 46' of the valve seat member 21.

It is obvious that the present structure, as outlined, is so structurally designed that the cooperating elements of the erected assembly are, substantially, all easily removable, as to those portions of the structure that come into contact with the milk for cleansing and sterilizing, and are easily reassembled for subsequent operations.

Having thus described my invention what I claim is:

1. A pasteurizing apparatus comprising a plurality of milk holders; means for intermittently and simultaneously emptying and filling some of said holders while holding others of said holders from filling or emptying; a flat supporting ring; vent pipes extending from the upper part of the holders through said ring; and a ring chamber cap secured over said ring and forming an annular chamber.

2. A pasteurizer comprising a holder; means for emptying and filling said holder; a chamber having a floor; a vent pipe extending from the upper part of the holder and projecting through said floor into said chamber; and a splash dome disposed over said pipe and spaced from the floor.

3. A pasteurizer comprising a plurality of milk holders; means for emptying and filling said holders; a flat supporting ring; vent pipes extending from the upper part of the holders through said ring and projecting above the ring; and a ring chamber cap secured over said ring and forming therewith an annular chamber.

4. A pasteurizing apparatus comprising a plurality of milk holders; means for successively simultaneously emptying and filling said holders; and a single filter simultaneously connecting with all of said holders.

5. A pasteurizing apparatus comprising a plurality of milk holders; means for emptying and filling said holders; vent means connecting to all of said holders; and a single filter connected to said vent means to filter all air entering thereinto; means to prevent back flow from the vent means to the holders; and over flow means for said vent means having a liquid seal.

6. A pasteurizing apparatus comprising a plurality of milk holders; means for emptying and filling said holders; vent means connecting to all of said holders; and a single filter connected to said vent means to filter all entering thereinto.

7. A pasteurizing apparatus comprising a liquid holder; means for emptying and filling said holder; vent means connecting with said holders; and exterior over flow means for said vent means having a liquid seal.

8. A pasteurizer comprising a plurality of milk holders; means for emptying and filling said holders; an annular chamber having a floor having an opening therein; a trough around the opening; vent pipes extending from the upper part of the holders and projecting into said chamber; a tube resting in said trough and having lower cut outs below the upper edges of the trough; and an air filter across the upper part of the tube.

9. A pasteurizing apparatus comprising a plurality of milk holders; means for intermittently and simultaneously emptying and filling some of said holders while holding others of said holders from filling or emptying; vent means connecting all of said holders with each other; and over flow means for said vent means having a liquid seal.

10. A pasteurizing apparatus comprising a plurality of milk holders; means for emptying and filling said holders; annular vent means connecting to all of said holders; and means to prevent any back flow from the vent means to the holders.

11. A pasteurizer comprising a plurality of milk holders; means for emptying and filling said holders; a flat supporting ring having an opening therein; vent pipes extending from the upper part of the holders through said ring; a ring chamber cap secured over said ring and forming an annular chamber; a ring like trough surrounding said opening; a tube resting in said trough and having lower cut outs below the upper edges of the trough; and an air filter across the upper part of the tube.

12. A pasteurizing apparatus comprising a plurality of milk holders, having means for intermittently and simultaneously emptying and filling some of said holders while holding others of said holders from filling or emptying, of air interchanging and filtering means, whereby to filter all incoming air to the holders, and, after the emptying of the first filled holder to cause interchange of air from the holder being filled to the holder being emptied and splash baffling means on said air interchanging and filtering means, said air filtering means being provided with a liquid seal and overflow discharge means.

13. A pasteurizing apparatus comprising a plurality of individual liquid holders; a valve communicating with said holders and including rotatable ported valve member; means for removably and releasably holding said valve member in operative position; a carriage; and means for conveying said carriage to position for receiving said valve, when released from its seat, and conveying it to and from a point of inspection.

14. A pasteurizing apparatus comprising a plurality of individual liquid holders; a valve seat thereon; duct forming means between said holders and seat; a source of liquid supply; rotatable ported valve; means for removably holding said valve to said seat in operative relation thereto; a wheeled carriage constructed to receive said valve, when released from said seat; and tracks receiving the carriage wheels for conveying the carriage to and from a point of inspection.

15. In a pasteurizing apparatus, a valve seat; a rotatable ported valve engaged with said seat; means for releasably holding said valve against said seat in operative relation thereto, and adapted to be released for lowering the valve from said seat; means for receiving said valve, when released from said seat, and conveying it to and from a point of inspection; said means including a carriage adapted to receive said valve and horizontal tracks on which the carriage rolls.

16. In a pasteurizing apparatus, a valve seat having a lower flat face; a rotatable ported valve engaged with said face; a ring gear around said valve; a drive gear engaged with the ring gear; means for releasably pressing said valve upwardly against said seat in operative relation thereto, and adapted to be released for lowering the valve from said face and said ring gear from said drive gear; conveyor means for receiving said valve, when released from said seat, and conveying it to and from a point of inspection.

17. Apparatus as in claim 16 in which said conveyor means includes a carriage adapted to receive said ring gear; and horizontal tracks on which the carriage rolls.

18. A pasteurizing apparatus comprising a plurality of liquid holders; a valve seat; duct forming means between said holders and seat; a feed pipe having a rounded lower end; a rotatable ported valve concentric with said pipe and having an upper spherical recess engaged with said end, said seat being provided with ducts for supplying milk to said holders from said supply pipe and for discharging milk from said holders.

19. A pasteurizing apparatus comprising a plurality of individual milk holders; a valve seat having a contact face; duct-forming means between said holders and face; a feed pipe having a rounded lower end; means including an intermittently rotatable ported valve having a contact surface and an upper spherical recess respectively engaged with said face and end and provided with ducts for supplying milk to said holders from said supply pipe; and means for pressing said valve against said face and rounded end in operative relation thereto.

20. A pasteurizing apparatus comprising a plurality of individual holders, a fixed valve seat below the bottom of the holders, duct forming means between said holders and seat, a source of milk supply above the holders having a central feed pipe; a removable intermittently rotatable ported valve for supplying milk to said holders from said feed pipe and for discharging milk from said holders, means for resiliently holding said valve to said pipe and seat in operative relation thereto, said pipe and valve having a cooperating spherical contact, said pipe and said valve being held in operative liquid tight contact by said resilient holding means.

21. A pasteurizing apparatus comprising a plurality of individual milk holders a valve seat having a lower flat face; duct forming means between said holders and face; a feed pipe having a lower end; means including an intermittently rotatable ported valve having a flat upper face and an upper recess respectively engaged with said face and end and provided with ducts for supplying milk to said holders from said supply pipe, and a spring for pressing said end into said recess.

22. A pasteurizing apparatus comprising a plurality of individual milk holders; a valve seat under the holders and having a lower flat face; duct forming means between said holders and face; a feed pipe having a lower end; an outlet pipe having a ball end; means including an intermittently rotatable ported valve having a flat upper face and a lower spherical recess respectively engaged with said face and ball end and provided with ducts for supplying milk to holders from said supply pipe and for discharging milk from said holders to said ball end; and means for pressing said ball end upwardly against said valve thereby to press said valve upwardly against said face.

23. A pasteurizing apparatus comprising a feed pipe; a supply tank received on the upper end of said pipe; spherical shoulder therearound; a cover for said tank; an inlet pipe passing down through the cover and having its lower end in the form of an inverted T discharging horizontally in opposite directions; a plurality of milk holders; and means receiving liquid from said feed pipe for successively emptying and filling said holders.

24. A pasteurizing apparatus comprising a feed pipe; a coupling means received on the upper end thereof; a supply tank resting on said means and having an opening received on said coupling means; and a nut threaded on the upper end of the coupling means and pressing on the bottom of the tank; alined radial holes being provided through said nut, means and pipe at the level of the bottom of the tank to drain the latter into the pipe; a plurality of liquid holders; and means receiving liquid from said feed pipe and supplying it to said holders.

25. In a pasteurizing apparatus, a feed pipe; a coupling member received on the upper end thereof and having a spherical shoulder therearound; a hub having a recess fitting on said shoulder; a supply tank resting on said hub and having an opening in its bottom received on said coupling member; a nut threaded on the upper end of the coupling member and pressing the bottom of the tank, liquid tight, on said hub; holes connecting with each other being provided to pass through said nut, member and pipe at the level of the bottom of the tank to drain the latter into the pipe; a plurality of milk holders; and means receiving liquid from said feed pipe feeding it to said holders.

26. A pasteurizing apparatus comprising a plurality of individual milk holders; a valve seat under the holders and having a lower flat face; duct forming means between said holders and face; a feed pipe; an outlet pipe; a rotatable ported valve having a flat upper face and upper and lower openings respectively engaged with said face and pipes and provided with ducts for supplying milk to said holders from said supply pipe and for discharging milk from said holders to said outlet pipe; one or both of said ducts having an extended portion extending out through a lateral face of said valve; and cap plates on said valve for closing said extended portions; each cap plate provided with an inner boss engaged in said portion and provided with end hooks; and tightening screws in the valve received in said end hooks.

27. A pasteurizing apparatus comprising a plurality of individual milk holders; a valve seat under the holders and having a lower flat face; duct forming means between said holders and face; a source of milk supply; means including a rotatable ported valve engaged with said face for supplying milk to said holders from said supply source and for discharging milk from said holders; a ring gear fast around said valve; and a Geneva drive gear engaged with the ring gear.

EMIL BEHRINGER.